United States Patent Office 3,580,809
Patented May 25, 1971

3,580,809
NUCLEAR REACTOR FUEL ELEMENT WITH
SPACED REDUCTIONS OF DIAMETER
Albert Etheridge Williams, Poulton, and William Simpson
Linkison, Blackpool, England, assignors to United
Kingdom Atomic Energy Authority, London, England
Filed Mar. 28, 1968, Ser. No. 716,725
Claims priority, application Great Britain, Apr. 12, 1967,
16,875/67
Int. Cl. G21c 3/04
U.S. Cl. 176—76                                      4 Claims

ABSTRACT OF THE DISCLOSURE

A fuel pin for a fuel element for a fast breeder nuclear reactor has diameter reductions to bring about a reduction in the cross-sectional area of fissile fuel in register with these diameter reductions, so reducing the heat rating of the volumes of fissile fuel in register with the diameter reductions and reducing the tendency of such volumes to melt in the event of a temperature excursion of the reactor. The resulting barriers to re-orientation of fuel by melting are advantageous. The application of the invention to vibrocompacted fuel and to a combination of vibrocompacted and pelleted fuel is described.

---

Figure 1:
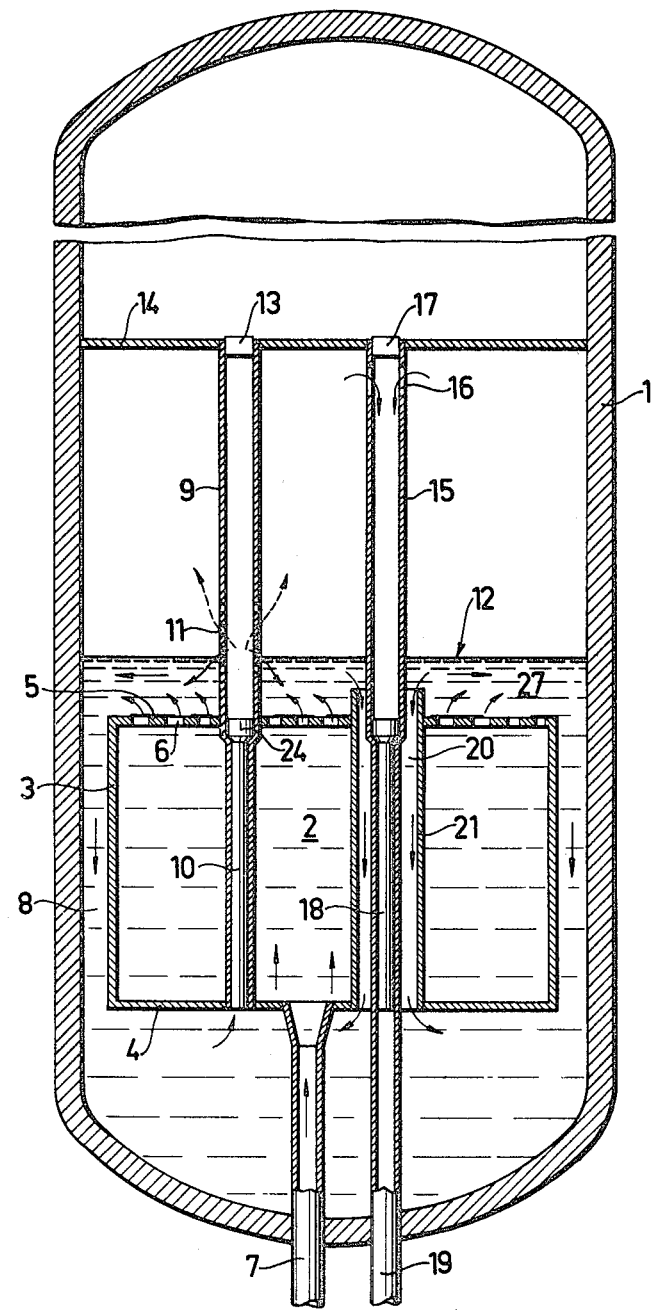

This invention relates to nuclear reactor fuel elements, and in particular to that kind of fuel element which includes a cluster of spaced parallel fuel pins, each pin comprising an elongate sheath containing ceramic nuclear fuel material.

Fuel pins of the same kind, particularly when employed in a fast breeder reactor, in which the fuel pins generally have a high heat rating, are subject to the disadvantage that if a temperature excursion of the reactor should occur, there is the possibility, which increases with the severity of the excursion, that the fuel material in the axial centre region of the fuel pins will melt and cause a physical reorientation of the fuel material within the sheath. Should this occur, the characteristics of the reactor core will change and could give rise to a power excursion. Furthermore, differential thermal expansion between fuel and sheath material can cause, unless restrained, a change in temperature coefficient of reactivity which results in axial instability, difficulty with control and kindred connected problems.

According to the invention, an elongate cylindrical fuel pin for a fuel element for a fast breeder nuclear reactor is provided with a multiplicity of longitudinally spaced reductions of diameter arranged so that the cross-sectional area of ceramic fuel material in register with each said diameter reduction is reduced compared with that of the remainder of the fuel material, whereby the volumes of fuel in register with said diameter reductions have a decreased heat rating and therefore their tendency to melt on occurrence of a temperature excursion of the reactor is reduced compared with the remainder of the fuel, thereby providing barriers against reorientation of the fuel within the pin.

It will be appreciated that the temperature of the fuel at the axial centre region of the fuel pin and in register with said diameter reductions is reduced compared with that of the remainder of the fuel material. Consequently, a temperature excursion sufficient to effect centre melting of the majority of the fuel material will, unless exceptionally severe, be insufficient to effect centre melting of the fuel material in register with the said diameter reductions. Consequently, large scale reorientation of fuel within the sheath of the pin will be prevented by virtue of the existence of the barriers against reorientation produced by the non-melted zones in register with said reductions. Furthermore, these barriers will assist in preventing large changes in temperature coefficient due to differential thermal expansion between fuel and sheath.

It is thought that a reduction in diameter of about 10% will be sufficient to cater for all but extremely severe temperature excursions, and will assist in providing against differential expansion problems. Greater reductions may be desirable but may be limited by what can be achieved in practice without unacceptably weakening the sheaths of the fuel pins.

According to another aspect of the invention, there is provided a nuclear reactor fuel pin of the kind having ceramic nuclear fuel material contained in a sheath, in which the sheath has inwardly projecting deformations at intervals along its fuelled length and the fuel material is in a heat transfer relationship with these deformations which is at least as good as with the remainder of the sheath so that, as a result of reduction of cross-sectional area of the fuel material at the inwardly projecting deformations, the centre temperature of the fuel material in service is depressed at these deformations.

Constructional embodiments of the invention will now be described by way of example, with reference to the accompanying diagrammatic drawings, wherein:

FIG. 1 is a fragmentary side view in section of a fuel pin for a fast breeder nuclear reactor, FIGS. 2A and 2B are enlarged side views in medial section, and when joined end-to-end illustrate the fuel pin of FIG. 1 in greater detail, and FIG. 3 is an enlarged side view in medial section of a short portion of a fuel pin for a fast breeder nuclear reactor, illustrating another construction.

Referring firstly to FIGS. 1, 2A and 2B, we provide a fuel pin 1 for a fast breeder nuclear reactor cooled by liquid sodium, the fuel pin 1 being typically 7 ft. 3¼″ in length and consisting of a stainless steel (for example AISI Type 316) sheath 2 containing both fissile fuel 3 and fertile fuel 4. The fissile fuel 3 consists of $UO_2/PuO_2$ powder vibrocompacted in situ to a typical density of 8.8 grams/cc. which is equivalent to about 80% of theoretical density, and is disposed in the upper central region of the fuel pin over a length of about 3 ft. Fertile fuel 4 providing upper and lower axial breeder regions is in the form of solid pellets 5 for the upper breeder region and annular pellets 6 for the lower breeder region, the fissile fuel 3 being separated from the upper breeder pellets 5 by a solid stainless steel spacer 7, and from the lower breeder pellets 6 by an annular stainless steel spacer 8 containing a fine filter 9 of stainless steel wool. A spacer 10 similar to the spacer 8 but containing a coarser filter 11 of stainless steel wool separates the breeder pellets 6 from a chamber 12 for the collection of gaseous fission products and formed by the lower interior of the fuel pin. The sheath 2 in the region of the chamber 12 is of reduced diameter (0.21″) compared with the central and upper regions of the sheath where the diameter is 0.23″. The sheath wall thickness is 0.015″. The end regions of the sheath 2 are provided with inner sleeves 13, 14 respectively and are swaged down and sealed with end welds 15, 16 respectively.

The spacers 8, 10 are located by crimping the sheath 2 into recesses 17, 18 respectively, whereas the solid spacer 7 is not so located. The top pellet of the pellets 5 forming the upper breeder region is located by abutment against the lower end of the inner sleeve 13.

In order to provide local fuel volume reductions of fissile fuel 3 for the purpose of the invention (which are pre-formed in the sheath 2 before fuel is loaded thereinto), there are three diameter reductions 19 spaced along the 3 ft. fueled length. Conveniently the spacing between the reductions 19 is constant at 9″. The diameter reductions are to 0.21" (representing a reduction of about 10%) or even to 0.205" (representing a reduction of about 12½%), and can successfully be accomplished without cracking by rotary butt swaging done cold. The axial length of the reductions is 0.25" with shallow leads-in 0.23" axial length. Alternatively, cold planetary swaging, for example employing equipment disclosed in British Pats. Nos. 946,407 and 987,988, may be employed to produce the diameter reductions; it is however recommended not to exceed about a 10% reduction if this method is employed, otherwise bore cracking may result. A further alternative for effecting the diameter reductions is by high energy shock waves to produce the required deformation, a mandrel suitably shaped to the required reduction profile being employed.

In the construction illustrated in FIG. 3, the sheath 20 of a fuel pin 21 (a short portion only of which is shown) closed and sealed at one end (not shown, but as described with reference to FIGS. 1, 2A and 2B) can be fitted in its fissile fuel region and on top of the lower axial breeder pellets and spacers as shown in FIG. 2B, with a predetermined number of plain cylindrical or, as shown, annular fissile fuel pellets 22, be subjected to local swaging at 23 just above the top of the stack of pellets 22, have a thin disc 25 of molybdenum or stainless steel placed on top of the pellet stack, have ceramic fissile fuel powder 24 applied in an amount sufficient to occupy the reduced volume and a little more, be subjected to vibration to compact the powder 24, have another thin disc 26 of molybdenum or stainless steel placed on top of the vibrocompacted powder, have the same predetermined number of fuel pellets 22 placed on top of the disc 26, be subjected to local swaging just above the top of the last-added pellets 22, and so on until the predetermined fueled length is sufficiently filled and can have its open upper end swaged and sealed after loading of the spacer and upper breeder region pellets as shown in FIG. 2A. The purpose of the discs 25, 26 is to prevent powder 24 from reorientating via the central hole 27 provided by the annular pellets; the presence of the discs 25, 26 is not necessary with solid cylindrical pellets. However, the discs 25, 26 where provided, assist in the formation of a "cool" fuel volume in the region of the diameter reductions, because, being better heat conductors than the fuel, they add to the conduction of heat away from the central regions of the said volumes and to the sheath where such heat is removed by the coolant flowing axially over the fuel pin.

It is noteworthy that in all the illustrated embodiments, there is close contact between the sheath and the fuel at the regions of diameter reduction of the sheath. Thus good heat transfer is retained in these regions as it already exists in the remaining regions, and the bringing about of a reduction in centre temperature of the fuel in register with the diameter reductions, which is the object of the invention, is thereby accomplished. In cases where the fuel pellets are annular, the intention behind the provision of the central hole is to reduce or prevent centre melting of the fuel during normal operation as well as to provide a passage for fission products generated in the fuel to pass to the chamber (12 in FIG. 2B) provided at the "cool" end of the fuel pin or to means (not shown) to vent the fission products to the external coolant. It is envisaged that with annular pellets, a temperature excursion may induce melting of fuel around the central bore of the pellets; the provision of diameter reductions is expected in all but the most severe of temperature excursions to prevent such melting in regions in register with such reductions and provide annular "platforms" of non-melted fuel, thus discouraging fuel reorientation and differential thermal expansion between fuel and sheath.

Uranium carbide or mixed uranium and plutonium carbides may alternatively be employed as the fuel material.

We claim:

1. An elongate cylindrical nuclear fuel pin comprising a stainless steel sheath containing fine vibrocompacted ceramic nuclear fuel powder wherein a multiplicity of widely longitudinally spaced necked-down portions of reduced diameter are provided along the length of the fuel pin, the cross-sectional area of ceramic fuel material in register with each said diameter reduction being reduced compared with that of the remainder of the fuel material, the density of ceramic fuel in register with each said diameter reduction being the same as that of the remainder of the vibrocompacted fuel powder, the transverse thickness of the necked-down portion of the fuel pin being smaller than the transverse thickness of the thicker portion by an amount such that at a given operating temperature, when the material in the center of the thick portion melts and tends to move downwardly, the material in the center of the necked-down portion will remain sufficiently solid to support the said melted material to prevent downward movement of the said melted material, the volumes of fuel in register with said diameter reductions thus having a decreased heat rating and therefore their tendency to melt on occurrence of a temperature excursion of the reactor being reduced compared with the remainder of the fuel to provide barriers against reorientation of the fuel within the pin.

2. A fuel pin according to claim 1, wherein the said reductions of diameter are within the range 10–12½%.

3. A fuel pin according to claim 1, wherein each region of reduction of diameter has registering therewith a volume of vibrocompacted fissile fuel powder and said volumes of vibrocompacted fuel powder are separated by stacks of fissile fuel pellets.

4. A fuel pin according to claim 1, wherein the said pellets are annular, and the volumes of vibrocompacted powder are separated from the pellet stacks by a thin metal disc.

References Cited
UNITED STATES PATENTS 3,281,921  11/1966  Danko et al. _____ 176—68X CARL D. QUARFORTH, Primary Examiner G. SOLYST, Assistant Examiner U.S. Cl. X.R.

176—83, 90